United States Patent Office 2,924,613
Patented Feb. 9, 1960

2,924,613

PRODUCTION OF COMPOUNDS OF THE VITAMIN-A SERIES

Horst Pommer, Ludwigshafen (Rhine), Germany, assignor to Badische Anilin- & Soda-Fabrik Aktiengesellschaft, Ludwigshafen (Rhine), Germany No Drawing. Application June 4, 1957
Serial No. 663,339

Claims priority, application Germany June 14, 1956

7 Claims. (Cl. 260—410.5)

This invention relates to a new and improved process for the production of the vitamin-A series.

I have found that compounds of the vitamin-A series are obtained in a simple manner by condensing beta-ionone in the presence of active metal with an epsilon-halogen-beta-methylsorbic acid ester of the general formula

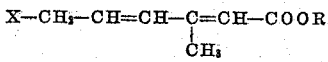

wherein X is halogen, splitting off water from the resultant condensation product of the general formula

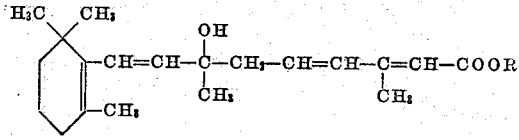

by the usual methods and then, if desired, hydrogenating the vitamin-A acid ester thus obtained to the vitamin-A alcohol by known methods.

The preferred halogen for which X is inserted in the formula of the beta-methylsorbic acid derivative referred to above is bromine, but the reaction may as well be run with the chlorine derivative. In the same formula R preferably is an alkyl radical with from 1-6, preferably 1 to 4, carbon atoms, i.e. the ester may be derived from methanol, ethanol, propanol, isopropanol or from one of the butanols. R, however, may also be a hexyl or benzyl radical.

Active metals, in the presence of which beta-ionone is condensed with the beta-methylsorbic acid derivative, are meant to include magnesium, zinc, cadmium or lithium, of which zinc is preferred. To add to their efficiency these metals may be treated with iodine or mercuric chloride. The metals are used in a quantity that is at least approximately equivalent to that of the beta-methylsorbic acid derivative.

In the practice of my invention the condensation can be carried out by heating a solution of beta-ionone, the active metal and the sorbic acid derivative. Suitable solvents are those having a boiling temperature of between 30° and 200° C., preferably between 30° and 115° C. at normal pressure. Examples of such solvents are aromatic hydrocarbons, such as benzene and toluene, and ethers, such as diethyl ether, diisopropyl ether, dioxane and tetrahydrofurane. The solvents shall be inert, i.e. they shall not undergo reaction with the substances present in the condensation.

The splitting off of water from, i.e. the dehydration of, the resultant condensation product having the aforesaid general formula is preferably carried out in solvents, such as benzene, toluene or isooctane by treatment with the dehydrating agents usual in polyene chemistry, as for example sulfuric acid, para-toluenesulfonic acid, iodine, phthalic anhydride, oxalic acid, acetic anhydride, phenyl isocyanates, acid salts and earths, halogen hydrides, or in the presence of organic bases, as for example ethylamine, dipropylamine, triethylamine, pyridine or collidine, with phosphorus oxychloride, phosphorus tribromide, phosphorus trichloride or thionyl chloride. The vitamin-A acid esters thus obtained can be purified by high vacuum distillation, chromatography or distribution between solvents. The esters are mixtures of different stereoisomeric forms; in the dehydration, for example with phosphorus oxychloride, in the presence of bases, such as pyridine, the cis-configuration predominates, whereas dehydration with para-toluenesulfonic acid or iodnie mainly leads to the trans-compounds. The isomerization of the cis-trans-isomers of vitamin-A-acid ester can be effected for example by sunlight in the presence or absence of traces of iodine or acid reactants, such as para-toluene sulfonic acid and a solvent, such as hexane or benzene. It is preferred to heat a solution of the vitamin-A-acid ester to be isomerized in a non-polar solvent with a little iodine.

The resultant vitamin-A-acid ester, mainly present in the all-trans-configuration, is a viscous yellow oil. It can be further purified, if desired, by distillation in high vacuum (molecular distillation) or by chromatography.

The discovery that epsilon-halogen-beta-methylsorbic acid esters can be condensed with beta-ionone in the presence of active metals is surprising because hitherto the reaction of epsilon-bromosorbic acid esters.

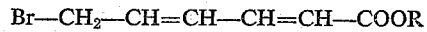

(without methyl side chains) with beta-ionone in the presence of active metals has not taken place at all or only with very unsatisfactory yields (see the works of Heilbron and collaborators, J. Chem. Soc., London, 1946, page 866, or Karrer and collaborators, Helv. Chim. Acta, 29 (1946), pages 573 and 1191, as well as the thesis of K. Bartram, Technical University of Braunschweig, 1949); a debromination of the epsilon-bromosorbic acid ester thereby takes place as the main reaction.

It was therefore entirely unexpected that the epsilon-halogen-beta-methylsorbic acid esters used according to this invention would undergo dehalogenation only to a quite subordinate extent when reacted with beta-ionone and active metals and would yield as main product in good yields the desired condensation product which can be directly converted into compounds of the vitamin-A series.

The epsilon-halogen-beta-methylsorbic acid esters can readily be prepared from the technically-accessible esters of 4-methyl-hexadiene-(2.4)-al-(1)-acid-(6) by reduction of the aldehyde group to the hydroxyl group, for example with aluminum isopropylate, and reaction of the resultant epsilon-hydroxy-beta-methylsorbic acid ester with phosphorus halides.

The process according to this invention thus represents in various respects an advance in the art.

The following example will further illustrate this invention but the invention is not restricted to this example. The parts specified in the example are parts by weight.

Example

A solution of 21 parts of beta-ionone and 25 parts of epsilon-bromo-beta-methylsorbic acid ethyl ester (melting point 53° C., obtainable in a yield of more than 90% by reaction of epsilon-hydroxy-beta-methylsorbic acid ethyl ester of the boiling point 133° to 135° C. at 0.06 Torr with phosphorus tribromide) in 80 parts of anhydrous tetrahydrofurane is allowed to flow in such a manner onto 8 parts of zinc activated with iodine which is contained in a vessel fitted with a reflux condenser that the mixture remains boiling. The whole is heated to boiling for a further 5 to 10 minutes, cooled and the dark coloured solution is poured onto a mixture of ice and excess phosphoric acid. The tetrahydrofurane layer is diluted with the same volume of ether and washed first with water, then with 5% sodium thiosulfate solution and finally again with water. It is dried with sodium sulfate, the ether evaporated and unconverted initial material distilled off under reduced pressure; this can be used again. There remain as a residue 23 parts of a viscous oil which consists mainly of the condensation product of the formula

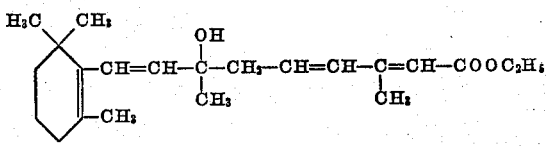

It can be purified by chromatographing its about 20% solution in petroleum ether on aluminum oxide of the activity stage II (according to Brockmann), development with benzene and ether and elution with ether, and is then obtained as a pale yellow, very viscous oil of which the solution in methanol exhibits an absorption band at 261 to 262 millimicrons ($\epsilon=15,300$).

The condensation product thus purified, or also the crude condensation product, of the above formula can be converted into vitamin-A acid ethyl ester as described in my copending application Serial Number 519,684 filed July 1, 1955, by heating a solution of 8 parts of the condensation product in 80 parts of benzene free from thiophene to the boiling point after the addition of a small amount, for example 0.4 part, of para-toluenesulfonic acid and while leading through nitrogen until the dehydration has been completed, washing the resultant yellow-red solution with sodium bicarbonate solution and with water, drying it over sodium sulfate and then distilling off the benzene under reduced pressure. There is obtained in a good yield vitamin-A acid ethyl ester which can be purified in known manner, for example by dissolving the ester in petroleum ether, chromatographing the solution on a column filled with activated alumina (standardized according to Brockmann) and subsequent stepwise elution with petroleum ether and a mixture of petroleum ether and benzene. The ester can be saponified to all-trans-vitamin-A-acid of the melting point 178° to 180° C. according to H. H. Inhoffen and F. and M. Bohlmann, Ann., 568 (1950), 47. Otherwise the ester can be reduced to vitamin-A alcohol, for example with calcium aluminum hydride. One of the practicable methods is described in the above mentioned copending application.

As described in my copending application, the reduction of the ester to vitamin-A alcohol can be achieved by using calcium aluminum hydride with tetrahydrofurane as the solvent. If the reduction is carried out with a cis-trans ester, the resulting vitamin-A alcohol is an isomeric mixture. This isomeric mixture may be changed to the trans form by heating solutions thereof in the presence of iodine.

In a specific example of the conversion of the vitamin-A ester to the vitamin-A alcohol in my aforesaid copending application, 0.8 gram of trans-vitamin-A-acid ethyl ester is dissolved in 20 ccs. of anhydrous tetrahydrofurane and the solution is dripped into 0.15 gram of 40% calcium aluminum hydride in 50 ccs. of anhydrous tetrahydrofurane, the reaction temperature not being allowed to exceed 5° C. Excess calcium aluminum hydride is destroyed by the slow addition of 3 grams of ethyl acetate in 30 ccs. of tetrahydrofurane at about 5° C. followed by the introduction of 2 ccs. of a saturated aqueous ammonium chloride solution. The precipitate is filtered off and the solvent distilled off from the filtrate in vacuo.

0.6 gram of vitamin-A-alcohol are obtained ($\lambda_{max}=325$ millimicrons, $\epsilon=38,000$).

I claim:

1. In the production of compounds of the vitamin-A series, condensing with beta-ionone an ester of an epsilon-halogen-beta-methylsorbic acid of the formula:

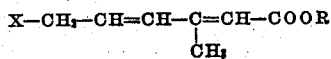

wherein X is from the group consisting of chlorine and bromine and R is from the class consisting of lower alkyl and benzyl groups, said condensation being carried out in the presence of an active metal reacting only with the terminal halogen of said ester.

2. The process of claim 1 wherein the active metal is selected from the class consisting of zinc, magnesium, cadmium and lithium.

3. The process of claim 2 wherein the condensation is carried out in an organic liquid having a boiling temperature between 30° C. and 200° C. and selected from the class consisting of hydrocarbons and ethers.

4. The process of claim 1 wherein the condensation is carried out in an organic liquid having a boiling temperature between 30° C. and 200° C. and selected from the class consisting of hydrocarbons and ethers.

5. In the production of compounds of the vitamin-A series, condensing in the presence of zinc an ester of epsilon-bromo-beta-methylsorbic acid of the formula

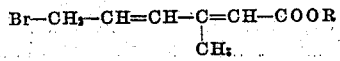

wherein R is from the class consisting of lower alkyl and benzyl groups with beta-ionone.

6. The process for the production of compounds of the vitamin-A series which comprises condensing an epsilon-halogen-beta-methylsorbic acid ester of the general formula

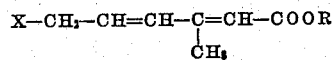

in which X is selected from the group consisting of chlorine and bromine and R is an alkyl group having from 1 to 6 carbon atoms with beta-ionone with the aid of an active metal reacting only with the halogen of said ester in the condensation reaction.

7. The process for the production of compounds of the vitamin-A series which comprises condensing an epsilon-halogen-beta-methylsorbic acid ester of the general formula

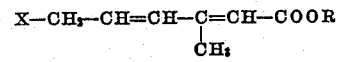

in which X is selected from the group consisting of chlorine and bromine and R is an alkyl group having from 1 to 6 carbon atoms with beta-ionone by boiling the said compounds in presence of an active metal selected from the class consisting of zinc, magnesium, cadmium and lithium in an organic liquid from the hydrocarbon and ether series having a boiling point between 30 and 150° C.

References Cited in the file of this patent

UNITED STATES PATENTS

| 2,540,118 | Isler | Feb. 6, 1951 |
| 2,576,103 | Cawley et al. | Nov. 27, 1951 |
| 2,674,621 | Oroshnik | Apr. 6, 1954 |
| 2,709,712 | Cawley et al. | May 31, 1955 |

FOREIGN PATENTS

| 619,898 | Great Britain | Mar. 16, 1949 |